United States Patent [19]

Ladacki

[11] 4,161,104
[45] Jul. 17, 1979

[54] IGNITION OF HYDRAZINE-TYPE MONOPROPELLANTS

[75] Inventor: Michael Ladacki, Woodland Hills, Calif.

[73] Assignee: Rockwell International Corporation, El Segundo, Calif.

[21] Appl. No.: 785,062

[22] Filed: Dec. 16, 1968

[51] Int. Cl.² .............................................. C06D 5/04
[52] U.S. Cl. ...................................... 60/218; 60/219; 149/36
[58] Field of Search .................... 149/36; 60/219, 218

[56] References Cited
U.S. PATENT DOCUMENTS

| 2,925,709 | 2/1960 | Mantell et al. ............... 60/218 X |
| 3,021,667 | 2/1962 | Griffin et al. ................. 60/219 X |
| 3,503,212 | 3/1970 | Jennings et al. .................. 60/219 |

Primary Examiner—Leland A. Sebastian
Attorney, Agent, or Firm—L. Lee Humphries; Robert M. Sperry

[57] ABSTRACT

In a gas generator system, a process for producing gases from hydrazine type monopropellants by the ignition of said propellants by silver nitrate or a mixture of silver nitrate with copper chromite for the decomposition of said propellants to their gaseous end products.

10 Claims, 1 Drawing Figure

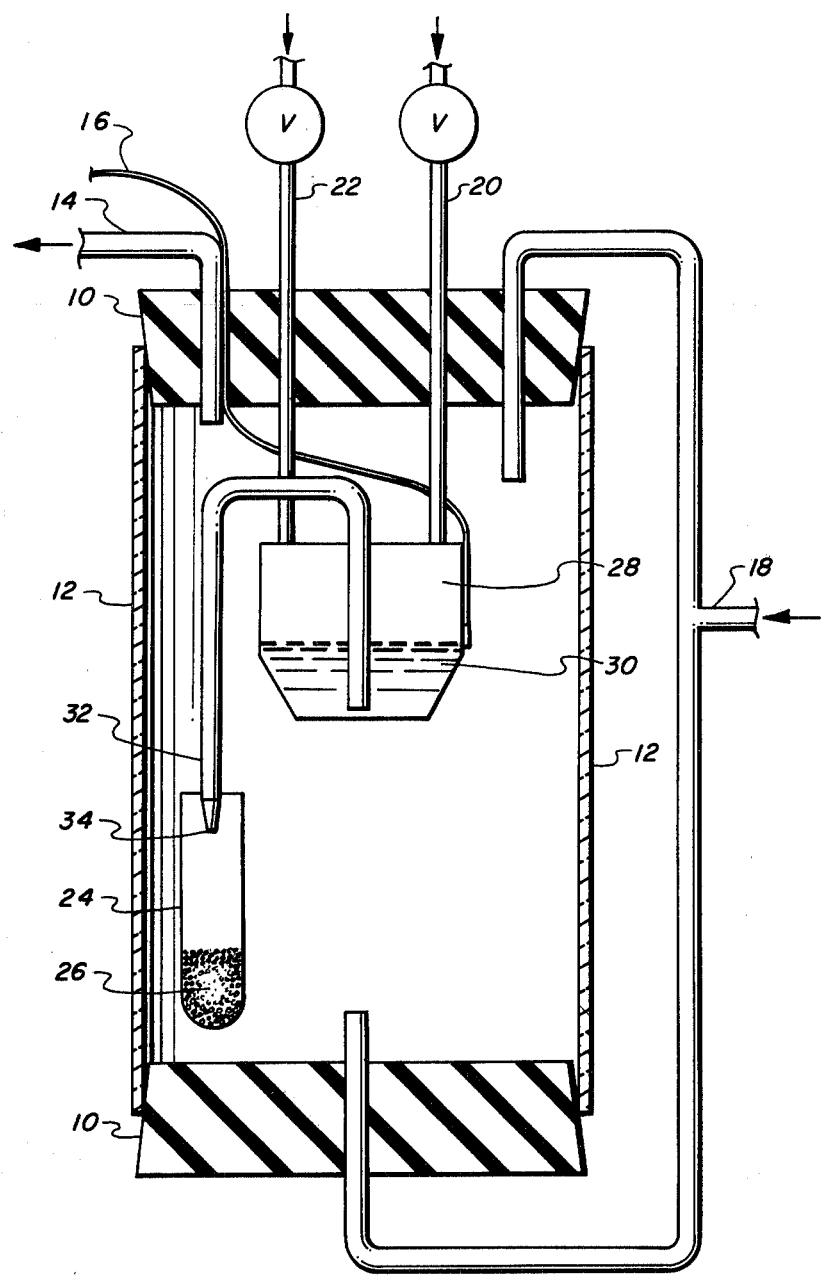

IGNITION OF HYDRAZINE-TYPE MONOPROPELLANTS

BACKGROUND OF THE INVENTION

The present invention is directed to a monopropellant gas generator system, but is also applicable to monopropellant rocket propulsion systems. More particularly, the invention relates to a novel method for the ignition of monopropellant and mixed monopropellant fuels. Specifically, the invention pertains to the employment of silver nitrate alone or mixed with copper chromite for the ignition and decomposition of monopropellants of the hydrazine and mixed hydrazine types.

Gas generators are widely used for a variety of purposes, such as the expulsion of liquid propellants, generation of electrical power, ejection of tube launched missiles, actuation of aerodynamic control surfaces, and like functions; monopropellant thrustors are used for attitude control. The power necessary to perform the purposes listed immediately above is usually obtained from the gases generated in the gas generator system by the decomposition of monopropellant and mixed monopropellant fuels.

The present agents employed for the ignition and decomposition of monopropellants appear to have limitations that complicate their usage. Some catalysts are employed for hydrazine, but their activity is generally insufficient to effect the necessary ignition of monomethylhydrazine or mixed hydrazine fuels and some catalysts are composed of rare ane expensive materials. Still other prior art catalysts may require a lengthy warmup involving internal heaters before the catalyst becomes operational for the ignition of the monopropellant. Some igniters, for example, the hypergolic igniter types, suffer limitations due to their hygroscopicity, corrosivity or toxicity. For example, iodine pentoxide is deliquescent and it creates serious storage and handling problems. In view of the present discussion, it is therefore immediately obvious to one versed in the gas generator art that these limitations and disadvantages associated with the prior art type igniters present serious problems for their successful employment in a wide variety of uses. It is further obvious to those skilled in the art that, if a novel igniter for a gas generator system is provided that essentially eliminates these prior art and other like problems, said igniter would represent a substantial contribution and unexpected advancement in the art.

Accordingly, it is an object of this invention to provide an acceptable and novel igniter for gas generator systems.

Still a further object of the present invention is to provide an igniter for the decomposition of monopropellants and mixed monopropellants.

Yet a further object of this invention is to provide an igniter that can be used alone or mixed with catalytic agents for the decomposition of hydrazine propellants and mixed hydrazine propellants.

A further object of the invention is to provide a silver nitrate and a silver nitrate-copper chromite igniter for gas generation systems.

Another object of the invention is to overcome the limitations and disadvantages associated with the prior art igniters.

These objects, advantages and features will become readily apparent to those skilled in the art from the following specification, drawing and the appended claims.

SUMMARY OF THE INVENTION

This invention is concerned with an igniter for use in a monopropellant gas generator system, and is also applicable to the rocket propulsion systems. The igniter, silver nitrate, can be used alone or, preferably, coupled with copper chromite for the decomposition of hydrazine and mixed hydrazine propellants.

The invention will further become better understood by reference to the following description of the accompanying drawing and disclosure. It is to be understood that the annexed sheet of drawing and disclosure are presented for the purpose of illustration of presently preferred embodiments of the present invention and that the scope and spirit of the invention are not to be limited thereto.

DESCRIPTION OF THE DRAWING

The accompanying drawing shows a schematic view of a conventional environment wherein the ignition process of the invention can be experimentally tested for gaseous production from monopropellants.

The apparatus, as set forth in said FIGURE, consists of a glass housing 12, provided with a cork or suitable closing means 10 at the ends of the glass housing. A conduit 18 enters the top and bottom cork 10 for permitting a gas, such as nitrogen gas or any inert gas, into the interior of said glass housing. An exit 14 is provided for permitting said gas, the gas that entered through 18, to leave said housing. Contained within the glass housing are a Pyrex test tube 24 having dispersed therein powdered silver nitrate 26. A conduit 32 connects test tube 24 to a container 28, which container contains a monopropellant such as hydrazine 30. A nitrogen inlet 20 extends through cork 10 into container 28. A second inlet 22 extends through cork 10 to container 28 for providing fuel or hydrazines into said container. A thermocouple 16 measures the temperature of the monopropellant, such as hydrazine.

Turning now to the drawing in operation, the system is first purged with nitrogen or an inert gas to produce an inert atmosphere. The container housing the monopropellant 28 is purged with nitrogen or an inert gas. Next, fuel is admitted into the monopropellant container. Then, sufficient pressure (psia) is applied through the valve 20 to force the hydrazine or other mixed monopropellant fuel up through tube 32 and down through nozzle 34 to drop into powder 26 where it is ignited and decomposed into its gaseous products. The ignition is observed visually, recorded photographically, or measured with a photocell.

DESCRIPTION OF THE INVENTION

In attaining the objects and features of the present invention, it has now been unexpectedly found that silver nitrate can be employed to enhance to the point of ignition the effectiveness of other catalysts in the decomposition of hydrazine type monopropellants and, furthermore, that silver nitrate alone can be used as an igniter for monopropellants of the hydrazine and mixed hydrazines type.

The mechanisms of the catalytic decomposition of hydrazines, as set forth in the prior art, most likely involve a series of reactions. For example, for hydrazine the initiation involves the split into two $NH_2$ radicals, as represented by the equation $N_2H_4 \rightarrow NH_2 + NH_2$, or the formation of a $N_2H_3$ radical. Catalytic surfaces aid in this initiation. The following propagation steps appear to be involved: $N_2H_3 \rightarrow N_2 + H_2 + H$; $H + N_2H_4 \rightarrow NH_3 + NH_2$; $H + N_2H_4 \rightarrow N_2H_3 + H_2$; $NH + N_2H_4 \rightarrow NH_3 + N_2H_3$; $H + NH_3 \rightarrow NH_2 + H_2$. The proposed termination steps are: $NH_2 + N_2H_3 \rightarrow NH_3 + N_2 + H_2$; $N_2H_3 + N_2H_3 \rightarrow 2NH_3 + N_2$; $H + N_2H_3 \rightarrow N_2 + 2H_2$; $H + NH_2 \rightarrow NH_3$. The overall stoichiometry is essentially $N_2H_4 \rightarrow NH_3 + \frac{1}{3}N_2 + \frac{1}{3}H_2$. Alkyl-substituted hydrazines yield other products, including a substantial amount of $CH_4$ and some HCN. It is these gaseous end products, particularly ammonia, nitrogen, hydrogen, and methane, that are suitable for effective employment in a gas generator system.

The hypergolic ignition of hydrazine with an igniter such as $I_2O_5$ or $KMnO_4$ involves the initial oxidation of the hydrazine; and, the heat of this oxidation reaction raises the termperature to the point where the monopropellant reaction becomes fast and self-sustaining.

Since most nitrates do not ignite hydrazine type monopropellants, it is believed that the ignition produced by the presence of $AgNO_3$ results not only from an unobvious, oxidation process but also involves the catalytic decomposition of the monopropellant by the reduced silver which is formed in situ during ignition. In addition, it is this reduced form of silver which enhances the catalytic activity of a catalyst, such as copper chromite, which may also be present in the ignition composition of matter. The reduction of $AgNO_3$ to Ag is highly exothermic, as can easily be seen from the following equation pertaining to the monomethylhydrazine:

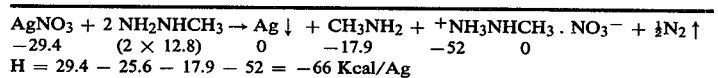

```
AgNO3 + 2 NH2NHCH3 → Ag↓  + CH3NH2 + +NH3NHCH3 . NO3− + ½N2↑
−29.4      (2 × 12.8)      0        −17.9            −52              0
H = 29.4 − 25.6 − 17.9 − 52 = −66 Kcal/Ag
```

Generally, about one-half gram of silver nitrate or the mixture of silver nitrate and cupric chromite is employed for 0.2 gram of monopropellant. Of course, once the ignition has started, the decomposition is self-sustaining.

The following examples were prepared according to the spirit of the present invention.

EXAMPLE I

In one embodiment of the present invention, indicating the decomposition of a hydrazine monopropellant, a pellet of copper chromite catalyst (Girdler G-13 Hydrogenation Catalyst) was placed in 2 ml of monomethylhydrazine in a Pyrex test tube. A slow, quiet gas evolution was observed. Then, a small amount, 0.1 to 0.2 g of silver nitrate, was added to the test tube. After a delay of about 1 to 2 seconds, during which the reduction of the silver nitrate by the monomethylhydrazine was taking place, there was a violent reaction resulting in the ignition of the monomethylhydrazine.

EXAMPLE II

Further tests, repeating the procedure discussed immediately above, demonstrated that a mixed silver nitrate-copper chromite catalyst causes ignition and decomposition of hydrazine fuels such as hydrazine, unsymmetrical dimethyl hydrazine (UDMH), mixed hydrazine fuels (such as MHF-5), and a fuel consisting of 50 percent of hydrazine and 50 percent of UDMH.

EXAMPLE III

In this test, the procedure was modified by placing in the test tube first a mixture of powdered copper chromite with silver nitrate, and then spraying onto it the monomethylhydrazine fuel. A virtually undelayed and smooth ignition, and subsequent decomposition of the propellant, took place.

EXAMPLE IV

In the present example, the effectivenness of silver nitrate alone as an igniter was demonstrated by spraying hydrazine onto powdered silver nitrate. A violent reaction and ignition occurred. The effectiveness was further demonstrated by the spraying of mixed hydrazine fuel (MHF-5) or monomethylhydrazine onto silver nitrate, which resulted in a violent reaction and flame, clearly indicating the decomposition of hydrazine fuels. However, unlike with the mixed igniter, the ignition was rough, rather explosive and often accompanied by a loud report.

EXAMPLE V

In this test, the effectiveness of copper chromite alone as an igniter was examined. The spraying of a hydrazine fuel onto a catalyst pellet gave no ignition. When the fuel was sprayed onto a powdered catalyst, an occasional weak ignition or sparking was observed in rather a nonreproducible manner.

EXAMPLE VI

Various hydrazine fuels were tested with the mixed igniter under conditions similar to chamber conditions. A silver nitrate and copper chromite mixture, of about equal weights, ground coarsely in a mortar and mixed, were placed in a glass vessel and sprayed with the hydrazine propellants by means of a hypodermic syringe. In the table, "+" indicates immediate ignition and "−" indicates no ignition.

Table 1

| IGNITION WITH MIXED SILVER NITRATE-COPPER CHROMITE | |
|---|---|
| Fuel | Ignition |
| Hydrazine | + |
| Monomethylhydrazine | + |
| Mixed Hydrazine Fuel (MHF-5) | + |
| Hydrazine-UDMH (50/50) | + |
| Hydrazine-Water (50/50) | − |

EXAMPLE VII

In this test, the effectiveness of the mixed igniter was further demonstrated in an inert atmosphere, under conditions simulating closer the chamber conditions. A hydrazine fuel (MHF-5) was placed in a small glass reservoir from which extended a capillary inverted U-tube. Under the open end of the capillary tube there was placed a small glass cup containing a mixture of powdered copper chromite and silver nitrate. The arrangement was inside a large glass enclosure purged with dry nitrogen gas. By suddenly applying pressure from a nitrogen gas cylinder to the fuel reservoir, the fuel was forced out through the capillary and the stream hit the mixed catalyst. An immediate ignition and subsequent decomposition of the propellant resulted.

The gases produced by the decomposition of hydrazine type fuels in the present invention can be used in any assembly or manner like gas generators, for driving turbine of a turbopump, for pressurizing propellant tanks, for auxiliary power requirements, for ullage, for lifting heavy loads in water, and the like.

Obviously, many modifications and variations of this invention are possible in the light of the above teachings, and it is, therefore, to be understood that within the scope of the claims, the invention may be practiced otherwise as specifically described.

I claim:

1. A process for producing gaseous hydrazine fuel reaction products comprising intimately contacting a hydrazine fuel with an ignition composition comprising silver nitrate and copper chromite and thereby igniting and decomposing said hydrazine fuel to produce said gaseous hydrazine fuel reaction products.

2. The process of claim 1 in which the hydrazine fuel is selected from the group consisting of hydrazine, hydrazine nitrate, monomethylhydrazine, unsymmetrical dimethyl hydrazine and mixtures thereof.

3. The process of claim 1 in which the hydrazine fuel is a mixture of hydrazine and unsymmetrical dimethyl hydrazine.

4. The process of claim 3 in which the hydrazine mixture contains 50 percent by weight hydrazine and 50 percent by weight unsymmetrical dimethyl hydrazine.

5. The process of claim 1 in which the ignition composition comprises a mixture of silver nitrate and copper chromite.

6. The process of claim 1 in which the ignition composition is in powdered form.

7. The process of claim 1 in which the ignition composition is in pellet form.

8. The process of claim 1 in which about 0.5 gram of ignition composition is employed for each 0.2 gram of hydrazine fuel.

9. The process of claim 1 in which the ignition composition contains about equal weights of silver nitrate and copper chromite.

10. The process of claim 1 in which the ignition and decomposition of the hydrazine fuel is conducted in the presence of an inert gas.

* * * * *